United States Patent
Akkar et al.

(10) Patent No.: US 8,959,311 B2
(45) Date of Patent: Feb. 17, 2015

(54) METHODS AND SYSTEMS INVOLVING SECURE RAM

(75) Inventors: Mehdi-Laurent Akkar, Juan les Pins (FR); Aymeric Stéphane Vial, Juan les Pins (FR); Olivier Charles Schuepbach, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 2415 days.

(21) Appl. No.: 11/531,043

(22) Filed: Sep. 12, 2006

(65) Prior Publication Data

US 2008/0052532 A1    Feb. 28, 2008

(30) Foreign Application Priority Data

Aug. 25, 2006    (EP) .................................... 06291368

(51) Int. Cl.
| | | |
|---|---|---|
| G06F 12/00 | (2006.01) | |
| G06F 13/00 | (2006.01) | |
| G06F 13/28 | (2006.01) | |
| G06F 21/74 | (2013.01) | |
| G06F 9/30 | (2006.01) | |
| G06F 9/38 | (2006.01) | |
| G06F 12/14 | (2006.01) | |
| G06F 12/02 | (2006.01) | |

(52) U.S. Cl.
CPC .............. *G06F 21/74* (2013.01); *G06F 9/3004* (2013.01); *G06F 9/3861* (2013.01); *G06F 12/1433* (2013.01); *G06F 12/0223* (2013.01); *G06F 12/1491* (2013.01)
USPC .......................................... 711/173; 711/170

(58) Field of Classification Search
CPC ............ G06F 12/0223; G06F 12/1433; G06F 12/1491; G06F 21/74; G06F 9/3004; G06F 9/3861
USPC .................................................. 711/173, 170
See application file for complete search history.

(56) References Cited

U.S. PATENT DOCUMENTS

| | | | | |
|---|---|---|---|---|
| 5,734,822 | A * | 3/1998 | Houha et al. ................... | 717/167 |
| 6,192,477 | B1 | 2/2001 | Corthell | |
| 6,272,587 | B1 * | 8/2001 | Irons .............................. | 711/103 |
| 6,704,871 | B1 * | 3/2004 | Kaplan et al. ................. | 713/192 |
| 6,708,273 | B1 * | 3/2004 | Ober et al. ..................... | 713/189 |
| 7,089,391 | B2 * | 8/2006 | Geiger et al. .................. | 711/170 |
| 7,484,074 | B2 * | 1/2009 | Hepkin et al. ................. | 711/208 |
| 2003/0046532 | A1 * | 3/2003 | Gast .............................. | 713/151 |
| 2004/0177261 | A1 | 9/2004 | Watt et al. | |
| 2004/0230813 | A1 * | 11/2004 | Check et al. ................... | 713/189 |
| 2005/0132211 | A1 | 6/2005 | Yunus et al. | |

(Continued)

*Primary Examiner* — Sheng-Jen Tsai
(74) *Attorney, Agent, or Firm* — Ronald O. Neerings; Frederick J. Telecky, Jr.

(57) ABSTRACT

A system is provided that includes a processor and a random access memory (RAM) coupled to the processor. The RAM is divided into public RAM and secure RAM. The system also includes a system memory coupled to the processor, wherein the system memory stores RAM resize instructions that, when executed, enable the public RAM and the secure RAM to be dynamically resized. The system memory may also store save/restore secure RAM instructions that, when executed, perform a save operation that saves the secure RAM to non-volatile memory and a restore operation that restores the secure RAM from the non-volatile memory. The system memory may also store arbitration instructions that, when executed, enable a cryptographic hardware accelerator (HWA) to be shared by a secure application and a public application.

13 Claims, 5 Drawing Sheets

(56) References Cited

U.S. PATENT DOCUMENTS

| | | | |
|---|---|---|---|
| 2005/0210280 A1* | 9/2005 | Paatero | 713/200 |
| 2005/0216651 A1 | 9/2005 | Tanabiki et al. | |
| 2006/0095741 A1* | 5/2006 | Asher et al. | 712/225 |
| 2007/0133280 A1* | 6/2007 | Oshiba et al. | 365/185.04 |
| 2007/0226795 A1* | 9/2007 | Conti et al. | 726/22 |

* cited by examiner

METHODS AND SYSTEMS INVOLVING SECURE RAM

CROSS-REFERENCE TO RELATED APPLICATIONS

This application claims priority to EP Patent Application No. 06291368.6 entitled "Methods and Systems Involving Secure RAM", filed Aug. 25, 2006. The above-referenced application is incorporated herein by reference.

BACKGROUND

Mobile electronic devices such as personal digital assistants (PDAs) and digital cellular telephones are increasingly used for electronic commerce (e-commerce) and mobile commerce (m-commerce). Programs that execute on the mobile devices to implement e-commerce and/or m-commerce functionality may need to operate in a secure mode to reduce the likelihood of attacks by malicious programs (e.g., virus programs) and to protect sensitive data.

For security reasons, at least some processors provide two levels of operating privilege: a first level of privilege for user programs; and a higher level of privilege for use by the operating system. However, the higher level of privilege may or may not provide adequate security for m-commerce and e-commerce, given that this higher level relies on proper operation of operating systems with highly publicized vulnerabilities. In order to address security concerns, some mobile equipment manufacturers implement yet another third level of privilege, or secure mode, that places less reliance on corruptible operating system programs, and more reliance on hardware-based monitoring and control of the secure mode. An example of one such system may be found in U.S. Patent Publication No. 2003/0140245, entitled "Secure Mode for Processors Supporting MMU and Interrupts."

In addition to this secure mode, various hardware-implemented security firewalls and other security monitoring components have been added to the processing systems used in mobile electronic devices to further reduce the vulnerability to attacks. Examples of these security improvements may be found in U.S. patent application Ser. No. 10/961,756, entitled "System and Method for Secure Mode for Processors and Memories on Multiple Semiconductor Dies Within a Single Semiconductor Package," Ser. No. 10/961,755, entitled "Method and System of Ensuring Integrity of a Secure Mode Entry Sequence," Ser. No. 10/961,344, entitled "System and Method of Identifying and Preventing Security Violations Within a Computing System," Ser. No. 10/961,748, entitled "Method and System of Verifying Proper Execution of a Secure Mode Entry Sequence," and European Patent Application EP 04292405.0, entitled "Method and System for Detecting a Security Violation Using an Error Correction Code," all of which are hereby incorporated by reference

SUMMARY

In at least some embodiments, a system comprises a processor and a random access memory (RAM) coupled to the processor. The RAM is divided into public RAM and secure RAM. The system further comprises a non-volatile memory coupled to the processor, wherein the non-volatile memory stores RAM resize instructions that, when executed, enable the public RAM and the secure RAM to be dynamically resized.

In at least some embodiments, a system comprises a processor and a random access memory (RAM) coupled to the processor, the RAM having a secure RAM portion. The system further comprises a system memory coupled to the processor. The system memory stores save/restore secure RAM instructions that, when executed, perform a save operation that saves the secure RAM portion to non-volatile memory and a restore operation that restores the secure RAM from the non-volatile memory.

In at least some embodiments, a system comprises a processor and a cryptographic hardware accelerator (HWA) coupled to the processor. The system further comprises a system memory coupled to the processor. The system memory stores HWA arbitration instructions that, when executed, enable the cryptographic HWA to be shared by a secure application and a public application.

BRIEF DESCRIPTION OF THE DRAWINGS

For a detailed description of exemplary embodiments of the invention, reference will now be made to the accompanying drawings in which:

FIG. 6 illustrates another method in accordance with embodiments of the disclosure.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the inventions are operable in a secure mode and in a mode outside the secure mode referred to herein as a "public mode". To support the public mode and the secure mode, memory such as Random Access Memory (RAM) is configured to store data and instructions associated with each mode. If the amount of RAM needed to support the public mode and the secure mode changes over time, embodiments are able to dynamically re-configure a static amount of RAM. For example, during a boot process, a public mode portion of the RAM can be maximized and a secure mode portion of the RAM can be minimized. Later, during run-time, the public mode portion of the RAM can be minimized and the secure mode portion of the RAM can be maximized. Other configurations are also possible.

In at least some embodiments, a device can be powered off while operating in the secure mode. Before powering off, the device selectively performs a save operation that saves the content of the secure mode portion of the RAM without changing any of the content. Upon powering up, the device selectively performs a restore operation that restores the content of the secure mode portion of the RAM without changing any of the content. In this manner, the device can be returned to the same state as before being powered off. In some embodiments, the save operation and the restore operation involve cryptography to protect the integrity and/or the privacy of the content of the secure mode portion of the RAM.

In at least some embodiments, at least one cryptographic hardware accelerator ("HWA") is available to public mode applications and secure mode applications. If the cryptographic HWA is shared between a public mode application and a secure mode application, security operations are performed upon entering and exiting the secure mode to protect the integrity and/or the privacy of secure mode data. For example, upon exiting the secure mode, the content of HWA registers can be saved in the secure mode portion of the RAM. The HWA registers are then cleaned to avoid sensitive data leakage and are made available to public mode applications. Upon entering the secure mode, the HWA registers are made private to secure mode applications (i.e., the HWA registers are not accessible to public mode applications). The HWA register content is then restored for the secure mode by loading HWA register content from the secure mode portion of the RAM. The HWA accelerator could also be shared between two secure applications by storing and restoring HWA register content in the secure mode portion of the RAM.

Figure 1:
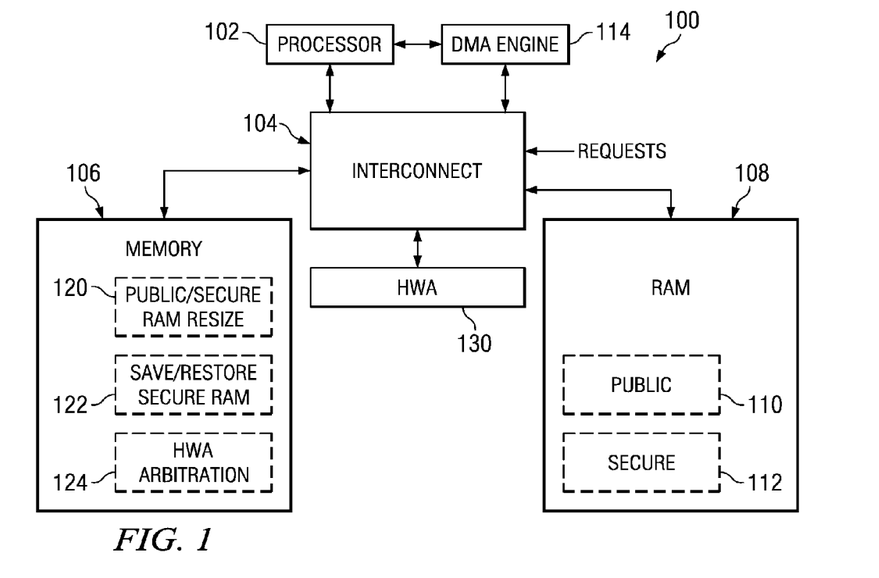
FIG. 1 shows a system in accordance with embodiments of the disclosure.

FIG. 1 shows a system 100 in accordance with embodiments of the invention. As shown in FIG. 1, the system 100 comprises a processor 102 coupled to an interconnect 104. The system 100 further comprises RAM 108, a HWA 130 and a memory (e.g., a non-volatile memory) 106 coupled to the interconnect 104. As shown, the RAM 108 has a public mode portion 110 and a secure mode portion 112. The public mode portion 110 can be used, for example, to download any data that does not require specific protection and the secure mode portion 112 can be used, for example, to store protected applications and secure data.

In at least some embodiments, the system 100 also comprises a Direct Memory Access (DMA) engine 114 coupled to the processor 102 and the interconnect 104. The DMA engine 114 enables components of the system 100 to communicate with each other directly via DMA channels. For example, DMA channels can be established between any of the memory 106, the HWA 130, and the RAM 108.

In FIG. 1, the memory 106 comprises public/secure RAM resize instructions 120, save/restore secure RAM instructions 122 and HWA arbitration instructions 124. When executed, the public/secure RAM resize instructions 120 enable the public mode portion 110 and the secure mode portion 112 of the RAM 108 to be resized. For example, if the RAM 108 has a size of 64 KB, the initial configuration may be 48 KB for the public mode portion 110 and 16 KB for the secure mode portion 112. As needed, the configuration of the RAM 108 can be changed to 32 KB for the public mode portion 110 and 32 KB for the secure mode portion 112 or other configurations as well. In at least some embodiments, public/secure RAM resize instructions 120 are called by an operating system (OS) or other application through a dedicated Application Programming Interface (API).

To re-configure the RAM 108, several resize functions such as a firewall adjustment function, a memory cleaning function and an organize memory function are performed. In at least some embodiments, the firewall adjustment function configures a firewall or other hardware to change the separation between the public mode portion 110 and the secure mode portion 112 of the RAM 108. The memory cleaning function cleans memory transferred from the secure mode portion 112 to the public mode portion 110 to ensure that no sensitive (confidential) data previously stored in the transferred portion is accessible. The organize memory function enables heaps, memory variables or other memory objects to be re-organized when the RAM 108 is re-configured. The organize memory function also organizes memory objects such as stacks and global variables such that dynamic reconfiguration of the RAM 108 is possible.

In at least some embodiments, the public/secure RAM resize instructions 120 determine if resizing the portions of RAM 108 is feasible before performing the resize functions. For example, the public/secure RAM resize instructions 120 may determine the amount of the public mode portion 110 and/or the amount of the secure mode portion 112 which is currently in use and determine the feasibility of resizing the RAM. Thus, if a request to increase the secure mode portion 112 is received, but more than a threshold amount of the public mode portion 110 is in use, then the request to increase the secure mode portion 112 can be refused or the resize can be adjusted to an acceptable amount. Alternatively, if a request to increase the secure mode portion 112 is received and less than a threshold amount of the public mode portion 110 is in use, then the request to increase the secure mode portion 112 can be accepted or the resize can be adjusted to an acceptable amount. In similar manner, determining an amount of the secure mode portion 112 which is in use and responding accordingly to requests to increase the public mode portion 110 is possible.

In at least some embodiments, the desired amounts of public mode RAM versus secure mode RAM vary inversely over time (i.e., the need for public mode RAM is high when the need for secure mode RAM is low or vice versa). For example, during a boot process of the system 100, it may be desirable to maximize the public mode portion 110 (to complete the boot process faster) and to minimize the secure mode portion 112 (no secure applications are running on the system 100 yet). Later, during run-time, the public mode portion 110 can be minimized and the secure mode portion 112 can be maximized. As an example, if the RAM 108 has a size of 64 KB, the RAM configuration during a boot process may be set as 48 KB for the public mode portion 110 and 16 KB for the secure mode portion 112. Later, during run-time, the RAM configuration may be set as 16 KB for the public mode portion 110 and 48 KB for the secure mode portion 112. Without dynamically resizing the 64 KB of RAM as described above, 96 KB (48 KB+48 KB) of static RAM would be needed to provide an equivalent amount of public mode RAM and secure mode RAM over time. The extra 32 KB of RAM (96 KB compared to 64 KB) undesirably increases expense, space requirements, and power consumption.

In at least some embodiments, the save/restore secure RAM instructions 122 enable the secure mode portion 112 of the RAM 108 to be saved and restored without changing the content of the secure mode portion 112. The save/restore secure RAM instructions 122 may be executed, for example, before or after the system 100 enters an "Off Mode". In either case, the save operation occurs before the system 100 is powered off. During the save operation, the content of the secure mode portion 112 is stored in a non-volatile memory such as the memory 106. Thus, the content of the secure mode portion 112 of the RAM 108 is maintained while the system 100 is powered off. Preferably, the save and restore operations are performed without affecting the content of the secure made portion 112. For example, even dynamic content such as variables and stacks can be saved by the save operation. The save and restore operations should at least enable the secure mode state of the system 100 prior to powering off to be restored.

After the save operation has been performed, the system 100 is able to perform the restore operation once the system 100 enters a "Wake Up Mode". In other words, when the system 100 wakes up again (or is powered on again), the restore operation restores the state of the secure mode that existed before the system 100 was powered off. During the restore operation, the content of the secure mode portion 112 is transferred from a non-volatile memory (e.g., the memory 106) to the secure mode portion 112 of the RAM 108. In at least some embodiments, the save/restore secure RAM instructions 122 are called by an operating system (OS) or other application through a dedicated Application Programming Interface (API). Additionally or alternatively, the save/restore secure RAM instructions 122 are called in response to user input. For example, before the system 100 is powered off, a user may choose whether to save/restore the same secure mode state or to power off the system 100 such that a system reboot is performed. In some embodiments, performing the save operation automatically causes the restore operation to be performed when the system 100 is powered on again. Alternatively, even if the save operation is performed, the system 100 could enable a user to choose whether to restore the saved secure mode state or to reboot the system 100 when the system 100 is powered on again. However, if the save operation is not performed, the restore operation cannot be performed upon powering on the system 100.

If desired, cryptography (e.g., hashing, enciphering or other cryptographic functions) can be implemented to protect the integrity and/or the privacy of the data stored in the secure mode portion 112. Also, in at least some embodiments, the save and restore operations are accelerated using the DMA engine 114. For example, a first DMA channel can be established between the RAM 108 and the HWA 130. Also, a second DMA channel can be established between the HWA 130 and the memory 108. Once the first and second DMA channels have been established, data can be securely transferred between the RAM 108 and the memory 106 (via the HWA 130) during the save and restore operations. By appropriately using the HWA 130, cryptographic functions and data verification (e.g., byte checks) are accelerated during the save and restore operations.

The HWA arbitration instructions 124 enable the HWA 130 to be shared by secure applications (i.e., applications that operate in the device's secure mode) and public applications (i.e., applications that operate in the device's public mode). If the HWA 130 is shared between a public mode application and a secure mode application, security operations are performed upon entering and exiting the secure mode to protect the integrity and/or the privacy of secure mode data. For example, upon exiting the secure mode, the content of HWA registers can be saved in the secure mode portion 112 of the RAM 108. The HWA registers are then cleaned to avoid sensitive data leakage and are made available to the public mode application. Upon entering the secure mode, the HWA registers are made private to the secure mode application (i.e., the HWA registers are not accessible to the public mode application). The HWA register content is then restored for operations in the secure mode by loading HWA register content from the secure mode portion 112 of the RAM 108. The HWA accelerator could also be shared between two secure applications by storing and restoring HWA register content for each of the secure applications in the secure mode portion 112 of the RAM 108.

Figure 2:
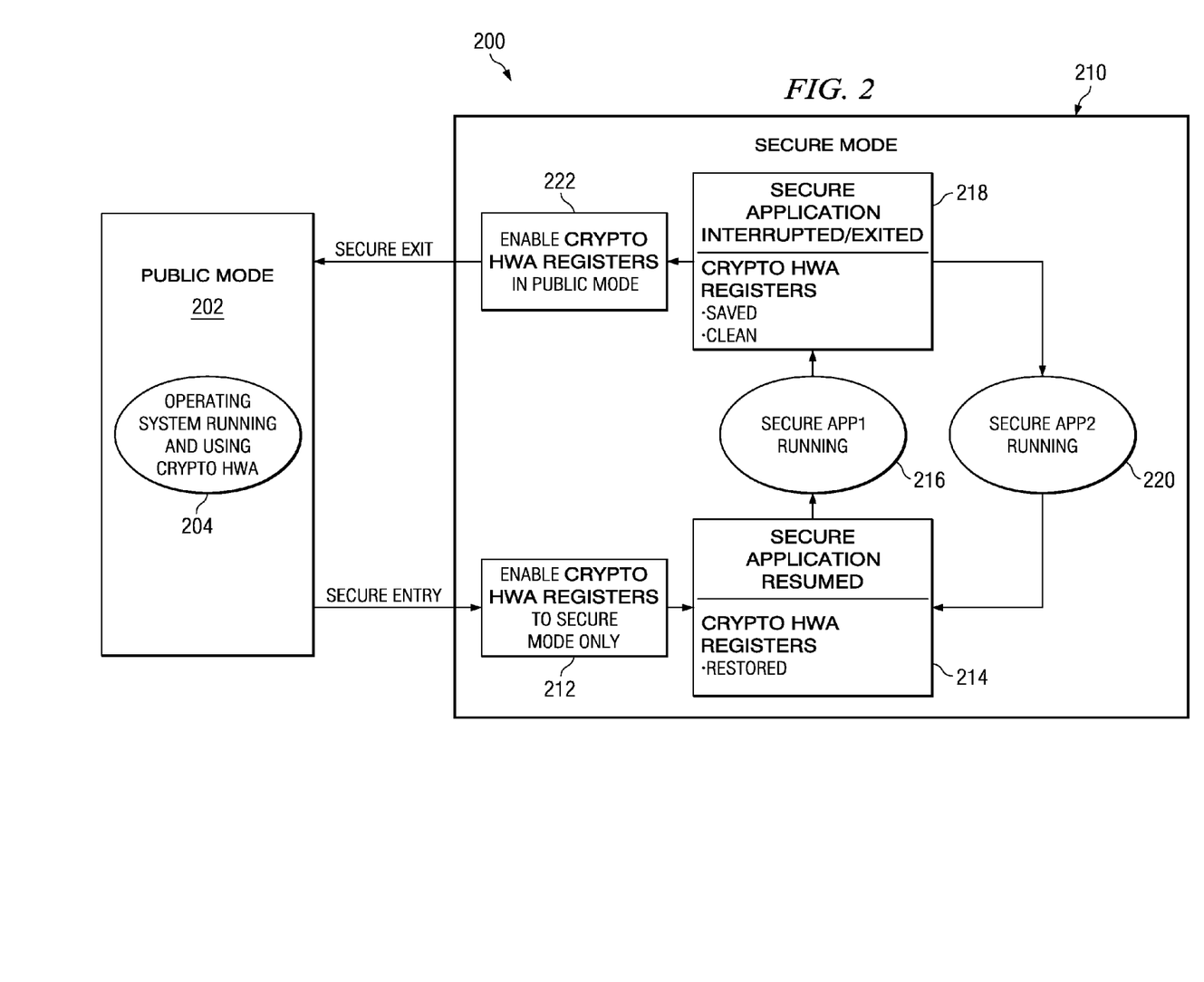
FIG. 2 illustrates a hardware accelerator (HWA) arbitration process in accordance with embodiments of the disclosure.

FIG. 2 illustrates a HWA arbitration process 200 in accordance with embodiments of the disclosure. In at least some embodiments, the HWA arbitration instructions 124 cause the HWA arbitration process 200 of FIG. 2 to be performed. As shown in FIG. 2, the HWA arbitration process 200 involves switching between a public mode (block 202) and a secure mode (block 210). In the public mode (block 202), an OS or other application uses the HWA 130 to accelerate cryptographic functions or data verification (block 204). Upon request, HWA arbitration process 200 switches from the public mode (block 202) to the secure mode (block 210). As part of the secure mode (block 210), HWA registers are enabled for secure mode only (block 212). In other words, the HWA registers are no longer accessible to any public mode applications. After the HWA registers are configured for secure mode only, the HWA register content is restored for use by a secure application (block 214). A secure application (referred to herein as "SECURE APP1") is then able to run in the secure mode (block 216). At some point, the SECURE APP1 is interrupted or exits (block 218). Due to the interruption or exit, the HWA register content is saved in the secure mode portion 112 of the RAM 108 and the HWA register content is cleaned (block 218).

If another secure application (referred to herein as "SECURE APP2") requests access to the HWA 130, this other secure application is able to run in the secure mode (block 220). In this manner, two or more secure applications are able to share the HWA 130, where the HWA register data corresponding to the different secure application can be stored and restored as needed. If a public application requests access to the HWA 130, an interruption or exit causes the HWA register content to be saved in the secure mode portion 112 of the RAM 108 and the HWA register content is cleaned (block 218). The HWA registers are than enabled to operate in the public mode (block 222). Finally, the HWA arbitration process 200 switches from secure mode (block 210) to the public mode (block 202). The HWA arbitration process 200 enables public applications and secure applications to share the HWA 130 as needed. In some embodiments, secure applications have higher priority than public applications to utilize the HWA 130. In other words, a public application would be unable to utilize the HWA 130 unless no secure applications are utilizing the HWA 130. Other techniques for HWA arbitration are also possible.

Figure 3:
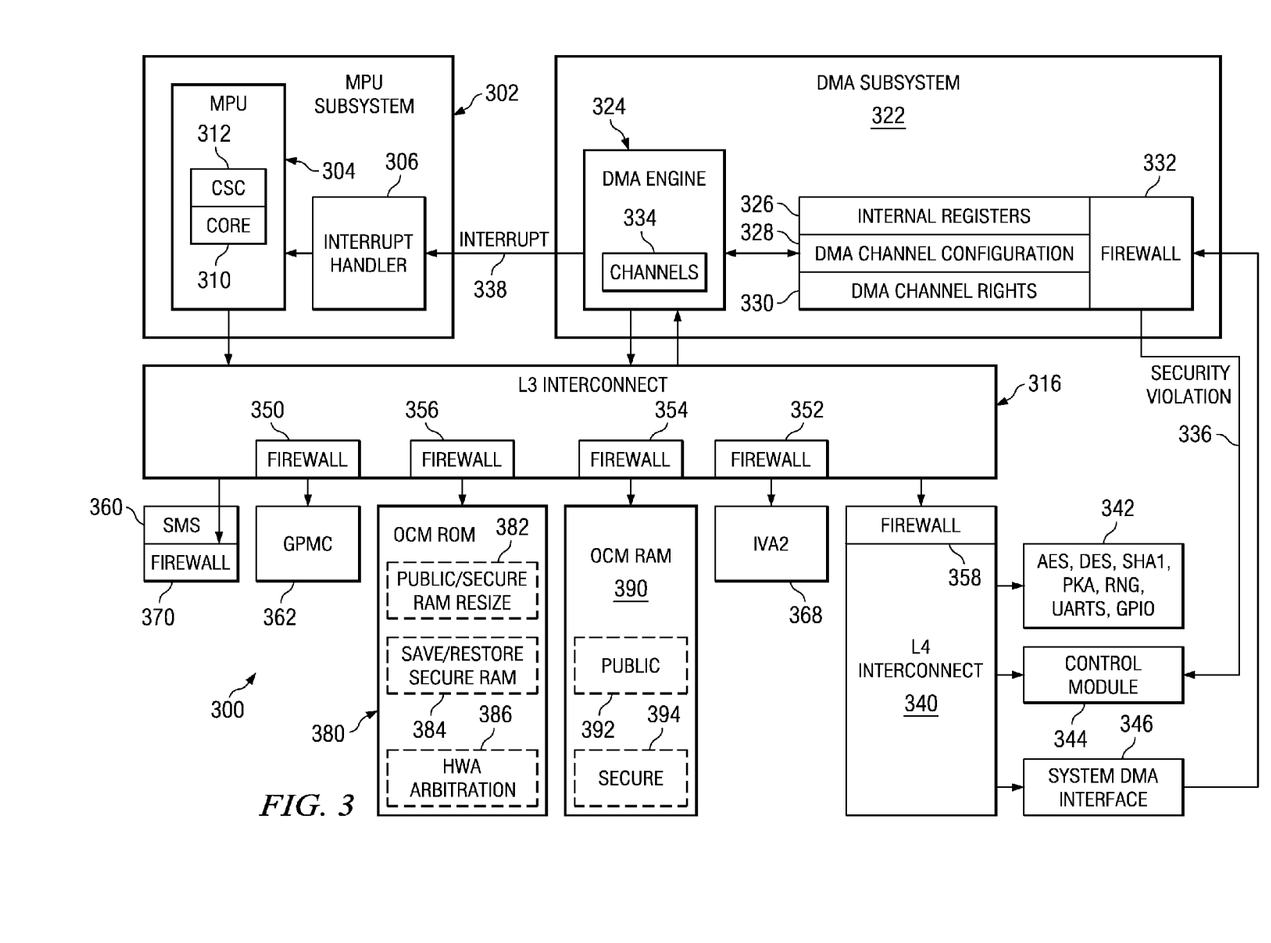
FIG. 3 shows another system in accordance with embodiments of the disclosure.

FIG. 3 illustrates another system 300 in accordance with embodiments of the disclosure. In accordance with at least some embodiments, the system 300 shows components of a mobile device such as a cellular telephone, personal digital assistant (PDA), text messaging system, or a device that combines the functionality of a messaging system, personal digital assistant and a cellular telephone.

As shown in FIG. 3, the system 300 includes a multiprocessing unit (MPU) subsystem 302 having a MPU 304 coupled to an interrupt handler 306. The MPU 304 includes a processor core 310 that executes programs and a core security controller (CSC) 312, which aids the MPU 304 in entering a secure mode for execution of secure applications on the core 310. The core 310 may be any processor suitable for integration into a system on a chip (SoC), such as the ARM 1136 series of processors. In other embodiments, the core 310 may be a processor that includes some or all of the functionality of the core security controller 312 as described herein, such as the ARM 1176 series of processors. The ARM 1136 and 1176 technology may be obtained from ARM Holdings plc of Cambridge, United Kingdom, and/or ARM, Inc. of Austin, Tex., USA.

As shown, the MPU subsystem 302 couples to a DMA subsystem 322 that enables memory accesses between DMA-compatible components ("targets") of the system 300. The DMA subsystem 322 has a DMA engine 324 with programmable DMA channels 334. The DMA subsystem 322 also has internal registers 326 such as DMA channel configuration registers 328 and DMA channel rights registers 330. The DMA channel configuration registers 328 are implemented to configure the DMA channels 334 as read channels or as read/write channels during DMA requests. The DMA channel rights registers 330 control the access rights of each DMA channel 334. These access rights could be based, for example, on the security rules and/or hardware constraints of the system's hardware security architecture (e.g., as determined by interconnect qualifiers). As used herein, the term "interconnect qualifier" or "qualifier" is intended to mean a signal embedded in an access (e.g., an Open Core Protocol (OCP) access). The qualifier reflects the state of the component that initiated the access at the time the access was initiated.

The DMA subsystem 322 also may comprise DMA status registers, source address registers, destination address registers, DMA length registers, DMA control registers, or other registers (not shown for convenience). In some embodiments, the DMA subsystem 322 is interconnected to DMA-compatible components (i.e., source locations or destination locations) via a hardware security architecture such as an L3 interconnect 316 having firewalls 350, 352, 354, and 356 and an L4 interconnection having a firewall 358. The DMA subsystem 322 also comprises a configuration firewall 332 that allows and restricts the usage of DMA channel qualifiers as will later be described. Although the L3 interconnect 316 and the L4 interconnect 340 described herein are implemented in some embodiments, alternative embodiments may implement other existing or future interconnect architectures.

In at least some embodiments, the DMA-compatible components mentioned previously comprise a SDRAM Memory Scheduler (SMS) component 360 having a firewall 370, a General Purpose Memory Controller (GPMC) component 362, an on-chip read-only memory (ROM) 364, an on-chip random access memory (RAM) 366, and an Image Video Accelerator (IVA2) component 368. In alternative embodiments, additional components, fewer components or different DMA-compatible components may be included. In at least some embodiments, the on-chip ROM 364 corresponds to the memory 106 of FIG. 1 and the on-chip RAM 366 corresponds to the RAM 112 of FIG. 1.

The system 300 further comprises an L4 interconnect core component 342 having logic that supports functions such as the Advanced Encryption Standard (AES), the Data Encryption Standard (DES), the Secure Hash Algorithm 1 (SHA1), Public Key Authentication (PKA), Random Number Generators (RNG), Universal Asynchronous Receiver/Transmitters (UARTs), and General Purpose Input/Outputs (GPIOs). In alternative embodiments, the L4 interconnect core component 342 may support additional functions, fewer functions or different functions. In at least some embodiments, the HWA 130 shown in FIG. 1 can be part of the interconnect core component 342. The system 300 further comprises a control module 344 that interfaces the L4 interconnect 340 to the DMA subsystem 322. As shown, the firewall 332 of the DMA subsystem 322 is configured to assert a security violation signal 336 to the control module 344 if a security violation occurs.

To comply with the system's hardware security architecture, the DMA channels 334 support usage of interconnect "qualifiers" that determine access rights to different protected memory spaces of the DMA-compatible components. Enforcement of the access rights associated with the interconnect qualifiers is based on firewalls such as the firewalls 350, 352, 354, 356, 358 and 332. In at least some embodiments, interconnect qualifiers such as "MReqType", "MReqPrivilege", "MReqDebug" and "MReqSecure" are used. Table 1 shows a definition and description of these qualifiers.

TABLE 1

| Qualifier | Definition | Description |
|---|---|---|
| MReqType | 0 Data mode<br>1 Instruction fetch mode | Indicates if an associated access request is an data access or an instruction (Opcode) fetch |
| MReqPrivilege | 0 Public mode access<br>1 Privilege mode access | Indicates if an associated access request is made in a public access mode or a privilege mode. |
| MReqDebug | 0 Functional mode<br>1 Debug mode | Indicates if an associated access request is made in a functional mode or a debug mode |
| MReqSecure | 0 Normal transaction mode<br>1 Secure transaction mode | Indicates if an associated access request is part of a normal transaction or a secure transaction |

If present, the MReqType qualifier shown in Table 1 comprises a logic "0" or "1". If the MReqType qualifier=0, an access request (channel configuration request) associated with the MReqType qualifier is part of a data access mode that transfers data to a non-executable memory space. If the MReqType qualifier=1, an access request associated with the MReqType qualifier is part of an instruction (Opcode) access mode that transfers data to an executable memory space.

If present, the MReqPrivilege qualifier comprises a logic "0" or "1". If the MReqPrivilege qualifier=0, an access request (channel configuration request) associated with the MreqPrivilege qualifier is a user mode access. If the MReqPrivilege qualifier=1, an access request associated with the MReqPrivilege qualifier is a privilege mode access. For example, in embodiments that implement ARM components, a plurality of privilege mode accesses are possible such as a "supervisor" mode access, a "system" access, an "interrupt request" (IRQ) access, a "fast interrupt request" (FIQ) access, an "abort" access, an "undefined" access or a "monitor" access A privilege mode access enables operations that are not available to user mode accesses.

If present, the MReqDebug qualifier comprises a logic "0" or "1". If the MReqDebug qualifier=0, the access request (channel configuration request) associated with the MReqDebug qualifier is a functional mode access. If the MReqDebug qualifier=1, the access request associated with the MReqDebug qualifier is a debug mode access. In at least some embodiments, the functional mode involves executing instructions using a processor and the debug mode involves executing instructions using an emulator.

If present, the MReqSecure qualifier comprises a logic "0" or "1". If the MReqSecure qualifier=0, an access request (channel configuration request) associated with the MReqSecure qualifier is a normal transaction mode access. If the MReqSecure qualifier=1, an access request associated with the MReqSecure qualifier is a secure transaction mode access. Qualifiers may be used together or separately to enable a variety of access rights. For more information regarding the use and enforcement of interconnect qualifiers, reference may be made to European Pat. App. No. EU 05 291 479 3, filed on Jul. 7, 2005 and entitled "Method and System For a Multi-Sharing Security Firewall", which is herein incorporated by reference.

While one or more of the previously described qualifiers are implemented in some embodiments, other embodiments may implement different qualifiers. The qualifiers MReqType, MReqPrivilege, MReqDebug and MReqSecure are simply used for convenience in describing embodiments that implement ARM components. However, these qualifiers should also be understood as being applicable to any system with different modes and different security levels. To support the different security levels, the DMA channels 334 are configured based on the different interconnect qualifiers. The DMA channel configuration process may occur once, periodically, or randomly (as needed).

In the embodiment of FIG. 3, the configuration firewall 332 is implemented to allow or restrict certain qualifiers on the DMA channels 334. The firewall 332 is accessible and the DMA channels 334 are configurable (or re-configurable) via the L4 interconnect 340. In some embodiments, the MPU 304 accesses the firewall 332 via the L4 interconnect 340 to configure the DMA channels 334. If the MPU 304 attempts to perform a DMA channel configuration that is not allowed (e.g., some channel configurations may be "locked"), in-band errors are sent back to the initiator that accessed the firewall 332 (e.g., the MPU 104) and out-band errors (e.g., the security violation signal 336) are generated to the control module 344 and later converted into an MPU interrupt 338. As used herein, "in-band errors" refer to errors that are embedded in a response transaction to the initiator. For example, a response transaction may include status information such as an "OK" indicator or a "FAIL" indicator that is returned to the initiator. As used herein, "out-band errors" refer to errors that are out of the initiator execution flow. For example, the firewalls may generate error signals that are outside the initiator execution flow. The out-band errors can be used to update status registers and/or to cause an interrupt such as the MPU interrupt 338 previously mentioned. The MPU interrupt 338 can be used to notify a user of the system 300, to disable one or more functions of the system 300, or to perform some other action in response to a security violation. For more information regarding detecting and responding to security violations, reference may be made to U.S. patent application Ser. No. 10/961,344, filed on Oct. 8, 2004 and entitled "System and Method of Identifying and Preventing Security Violations Within a Computing System", which is herein incorporated by reference.

In the system of FIG. 3, the public/secure RAM resize instructions 382, the save/restore secure RAM instructions 384 and the HWA arbitration instructions 386 perform the same or similar functions as the public/secure RAM resize instructions 120, the save/restore secure RAM instructions 122 and the HWA arbitration instructions 124 described for FIG. 1. FIG. 3 simply illustrates how some embodiments implement the public mode and the secure mode previously described. Also, FIG. 3 illustrates how some embodiments support secure DMA channel configurations that could be used with the save and restore operations previously described. If a security violation is detected (e.g., a public application attempts to operate in the secure mode or to access secure data), the system 300 is able to detect the violation and respond accordingly.

Figure 4A:
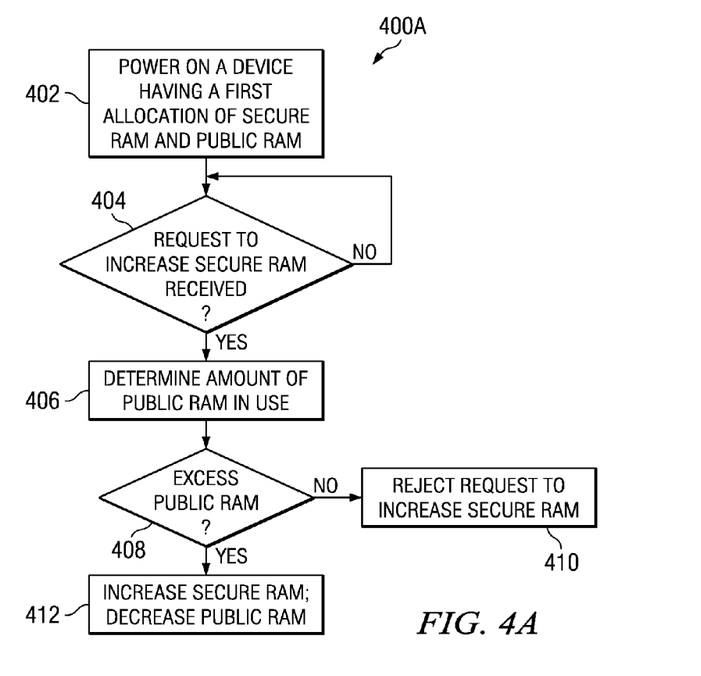
FIGS. 4A-4B illustrate methods in accordance with embodiments of the disclosure.

FIG. 4A illustrates a method 400A in accordance with embodiments of the disclosure. As shown in FIG. 4A, the method 400A comprises powering on a device having a first allocation of secure RAM and public RAM (block 402). If a request to increase secure RAM is not received (determination block 404), the method 400A returns to the determination block 404. If a request to increase secure RAM is received (determination block 404), the method 400A determines an amount of public RAM in use (block 406). If there is not excess public RAM (determination block 408), the request to increase secure RAM is rejected (block 410). If there is excess public RAM (determination block 408), the method 400A increases secure RAM and decreases public RAM (block 412).

Figures 4B, 5:
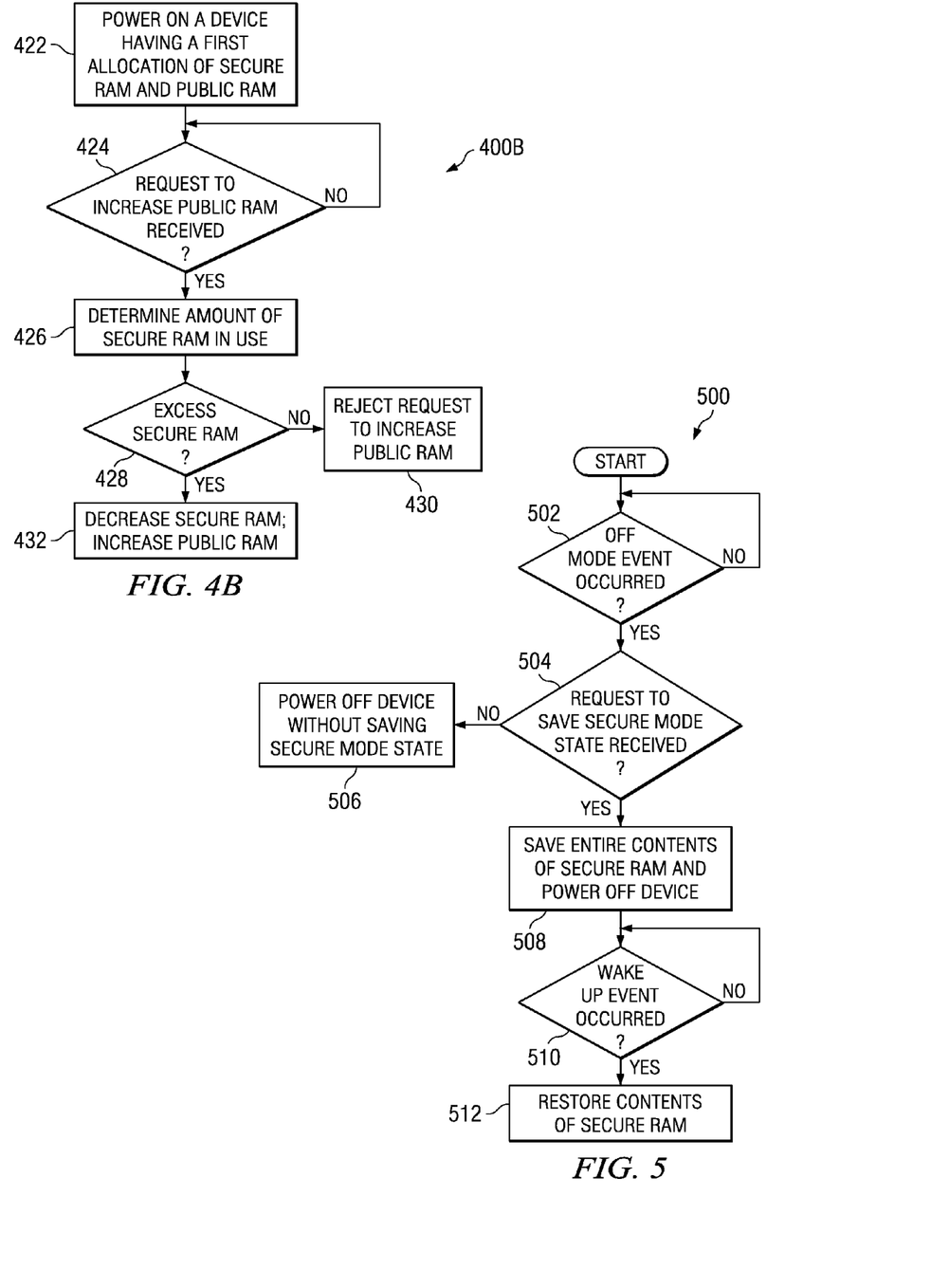
FIG. 5 illustrates another method in accordance with embodiments of the disclosure.

FIG. 4B illustrates another method 400B in accordance with embodiments of the disclosure. As shown in FIG. 4B, the method 400B comprises powering on a device having a first allocation of secure RAM and public RAM (block 422). If a request to increase public RAM is not received (determination block 424), the method 400B returns to the determination block 424. If a request to increase public RAM is received (determination block 424), the method 400B determines an amount of secure RAM in use (block 426). If there is not excess secure RAM (determination block 428), the request to increase public RAM is rejected (block 430). If there is excess secure RAM (determination block 428), the method 400B increases public RAM and decreases secure RAM (block 432).

FIG. 5 illustrates a method 500 in accordance with embodiments of the disclosure. As shown in FIG. 5, the method 500 waits for an "Off Mode" event to occur (determination block 502). For example, the Off Mode event could be based on a request from a user or a time-out feature that determines when no activity has occurred for a threshold amount of time. If the Off Mode event occurs (determination block 502), the method 500 continues by determining if a request to save a secure mode state is received (determination block 504). If no request to save a secure mode state is received (determination block 504), a device is powered off without saving the secure mode state (block 506). If a request to save a secure mode state is received (determination block 504), the entire contents of secure RAM are stored and the device is powered off (block 508). In at least some embodiments, the contents of the secure RAM are stored in a non-volatile memory that retains the contents while the device is powered off.

If a "Wake Up" event does not occur (determination block 510), the method 500 waits at determination block 510. The Wake Up event may be, for example, a user pressing an input button or some other event. If a Wake Up event does occur (determination block 510), the contents of the secure RAM are restored (block 512). For example, a DMA operation may be used to transfer the contents from a non-volatile memory to the secure RAM. If desired, cryptography can be implemented to protect the integrity and/or the privacy of the secure RAM contents during the save and restore operations.

Figure 6:
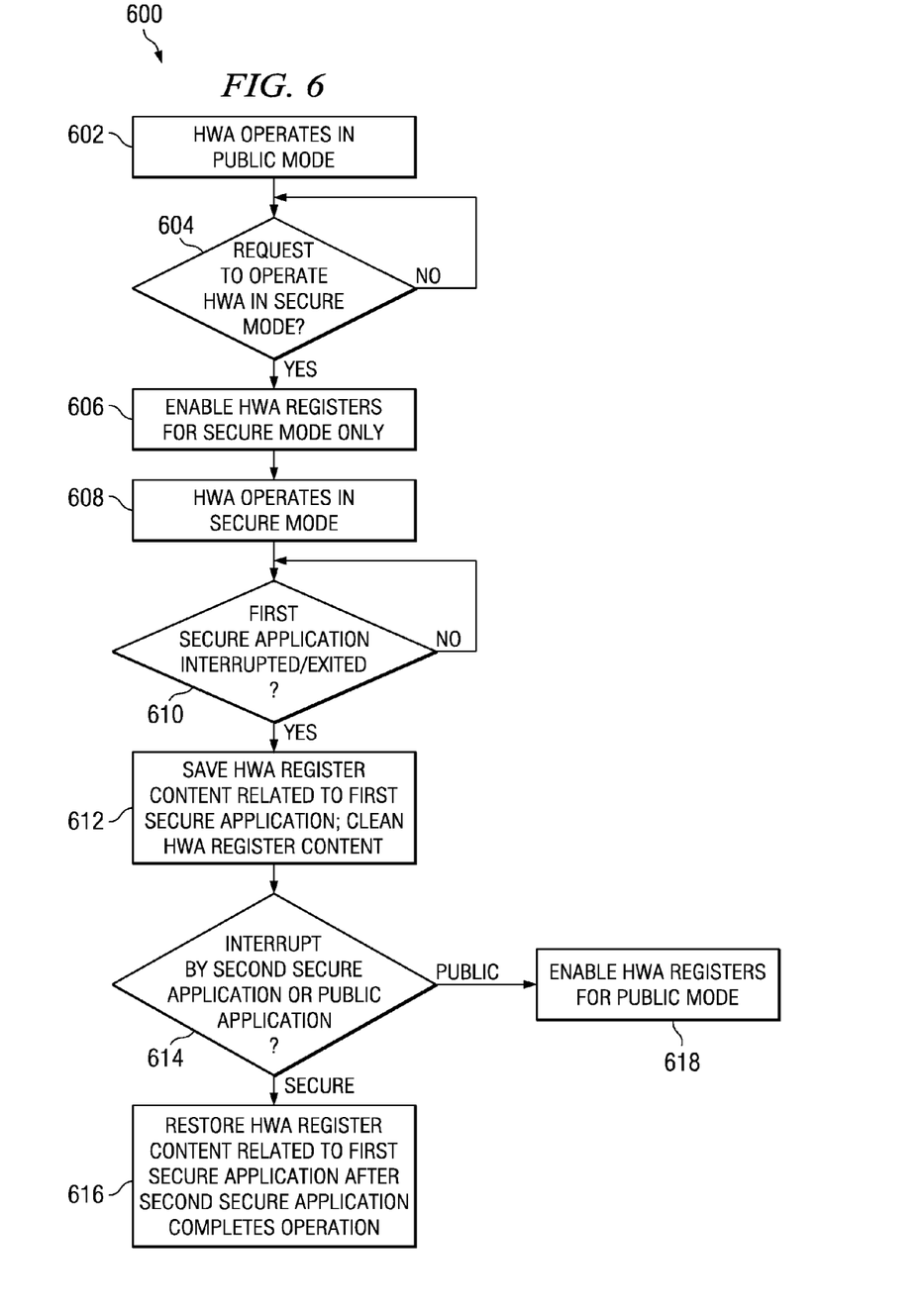

FIG. 6 illustrates another method 600 in accordance with embodiments of the invention. As shown in FIG. 6, the method 600 comprises a HWA operating in a public mode (block 602). In other words, the HWA is utilized by a public application. The method 600 then waits for a request to operate the HWA in a secure mode (determination block 604). If a request to operate the HWA in a secure mode is received (determination block 604), HWA registers are enabled for secure mode only (block 606). In other words, only secure applications are able to access the HWA registers. The HWA then operates in the secure mode (block 608). If a first secure application is not interrupted or exited (determination block 610), the method 600 waits at the determination block 610. If the first secure application is interrupted or exits (determination block 610), the method 600 saves HWA register content related to the first secure application and cleans the HWA register content (block 612). If an interrupt corresponds to a second secure application (determination block 614), the HWA register content related to the first secure application can be restored after the second secure application which asserted the interrupt completes an operation (block 616). If an interrupt corresponds to a public application (determination block 614), the HWA registers are enabled for a public mode (block 618). In at least some embodiments, secure applications have higher priority than public applications to utilize the HWA. In such embodiments, a public application could utilize the HWA if no secure applications are utilizing the HWA.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications

What is claimed is:

1. A system, comprising:
a processor;
a random access memory (RAM) coupled to the processor, the RAM divided into public RAM and secure RAM;
a system memory coupled to the processor, wherein the system memory stores RAM resize instructions that, when executed, enable the public RAM and the secure RAM to be dynamically resized; and
a cryptographic hardware accelerator (HWA), wherein the system memory stores save/restore secure RAM instructions that, when executed, perform a save operation that saves all secure RAM content to non-volatile memory and a restore operation that restores all secure RAM content from the non-volatile memory, and wherein the system memory stores HWA arbitration instructions that, when executed, enable the cryptographic HWA to operate in a secure mode and a public mode.

2. The system of claim 1 wherein, during a boot process of the system, the public RAM is selectively maximized while the secure RAM is minimized.

3. The system of claim 1 wherein, during run-time of the system, the public RAM is selectively minimized while the secure RAM is maximized.

4. The system of claim 1 wherein the RAM resize instructions determine at least one of an excess amount of public RAM and an excess amount of secure RAM.

5. The system of claim 4 wherein, if an excess amount of public RAM exists, the RAM resize instructions increase the amount of secure RAM and decrease the amount of public RAM in proportion to the amount of excess public RAM.

6. The system of claim 4 wherein, if an excess amount of secure RAM exists, the RAM resize instructions increase the amount of public RAM and decrease the amount of secure RAM in proportion to the amount of excess secure RAM.

7. The system of claim 1 wherein the RAM resize instructions cause the processor to perform a resize function selected from the group consisting of,
reconfiguring a firewall that divides the public RAM and the secure RAM;
cleaning memory that is switched from secure RAM to public RAM;
organizing memory heaps and variables in response to resized public RAM and secure RAM; and
organizing stacks and global variables to ensure dynamic resize of public RAM and secure RAM is possible.

8. A system, comprising:
a processor;
a cryptographic hardware accelerator (HWA) coupled to the processor; and
a system memory coupled to the processor, wherein the system memory stores HWA arbitration instructions that, when executed, enable the cryptographic HWA to be shared by a secure application and a public application;
wherein the system memory stores RAM resize instructions that, when executed, enable the public RAM portion and the secure RAM portion to be dynamically resized based on use; and
wherein the system memory stores save/restore secure RAM instructions that, when executed, saves the entire secure RAM portion to non-volatile memory before the system powers off and restores the entire secure RAM portion from the non-volatile memory when the system powers on again.

9. The system of claim 8 wherein the cryptographic HWA comprises HWA registers and wherein the HWA arbitration instructions, when executed, selectively set the HWA registers to a secure mode associated with the secure application and to a public mode associated with the public application.

10. The system of claim 9 wherein, during the secure mode, the HWA registers are only accessible to secure applications.

11. The system of claim 9 wherein, during the secure mode, the HWA arbitration instructions selectively save and restore content of the HWA registers.

12. The system of claim 9 wherein the HWA arbitration instructions, when executed, clean the HWA registers before switching from the secure mode to the public mode.

13. The system of claim 9 wherein, during the secure mode, the HWA arbitration instructions enable the cryptographic HWA to be shared by multiple secure applications.

* * * * *